United States Patent
Ronchieri et al.

(10) Patent No.: US 9,127,812 B2
(45) Date of Patent: Sep. 8, 2015

(54) VESSEL OF A HEAT STORAGE AND RELEASE APPARATUS, HEAT STORAGE AND RELEASE ASSEMBLY, AND ENERGY PRODUCTION PLANT

(75) Inventors: Andrea Ronchieri, Massa (IT); Michele D'Ercole, Florence (IT); Alessandro Szorenyi, Massa (IT)

(73) Assignee: Nuovo Pignone S.P.A., Florence (IT)

(*) Notice: Subject to any disclaimer, the term of this patent is extended or adjusted under 35 U.S.C. 154(b) by 220 days.

(21) Appl. No.: 13/426,795

(22) Filed: Mar. 22, 2012

(65) Prior Publication Data
US 2012/0285654 A1    Nov. 15, 2012

(30) Foreign Application Priority Data
Mar. 22, 2011   (IT) .............................. CO2011A0011

(51) Int. Cl.
*F01K 1/00*    (2006.01)
*F01K 3/00*    (2006.01)
(Continued)

(52) U.S. Cl.
CPC ... *F17C 5/06* (2013.01); *F17C 1/14* (2013.01); *F17C 7/00* (2013.01); *F28D 20/0056* (2013.01);
(Continued)

(58) Field of Classification Search
CPC ............. F17C 1/14; F17C 5/06; F17C 7/00; F17C 2201/0109; F17C 2201/0123; F17C 2201/0142; F17C 2201/035; F17C 2201/054; F17C 2201/06; F17C 2203/0304; F17C 2203/0604; F17C 2203/0607; F17C 2203/0609; F17C 2203/0619; F17C 2203/0621; F17C 2203/0624; F17C 2203/0639; F17C 2203/0643; F17C 2205/0142; F17C 2205/0146; F17C 2205/018; F17C 2205/0341; F17C 2205/0397; F17C 2209/2109; F17C 2209/221; F17C 2209/232; F17C 2221/031; F17C 2223/0123; F17C 2223/035; F17C 2225/0123; F17C 2225/035; F17C 2227/0157; F17C 2227/0185; F17C 2260/046; F17C 2265/07; F17C 2270/0134; Y02E 60/15; F02C 6/16; F02C 6/14; F01K 3/00
USPC ....................... 60/645–681, 682; 165/10, 902
See application file for complete search history.

(56) References Cited

U.S. PATENT DOCUMENTS 4,016,997 A    4/1977 Roffler
4,147,204 A    4/1979 Pfenninger
(Continued)

FOREIGN PATENT DOCUMENTS

CN    101289963 A    10/2008

OTHER PUBLICATIONS

Search Report from corresponding IT Application CO2011A000011, Date as Aug. 16, 2011.
(Continued)

*Primary Examiner* — Christopher Jetton
(74) *Attorney, Agent, or Firm* — GE Global Patent Operation

(57) ABSTRACT

A vessel of a heat storage and release apparatus, the vessel comprises a shell comprising a metallic material, the shell having an elongated shape with a first end region and a second end region remote from the first end region, and an internal surface defining a cavity configured to contain a heat storage and release device and to guide gas-flow; a first opening through the shell for a flow of gas at high temperature and high pressure, the first opening being located in the first end region; a second opening through the shell for a flow of gas at low temperature and high pressure, the second opening being located in the second end region; and a lining of thermally insulating material adjacent to the internal surface and only partially covering the internal surface, the lining being located at least in the first end region.

19 Claims, 4 Drawing Sheets

(51) Int. Cl.
  *F01K 25/02* (2006.01)
  *F02C 1/04* (2006.01)
  *F28D 17/00* (2006.01)
  *F28D 19/00* (2006.01)
  *F17C 5/06* (2006.01)
  *F28D 20/00* (2006.01)
  *F17C 1/14* (2006.01)
  *F17C 7/00* (2006.01)

(52) U.S. Cl.
  CPC ..... *F02G 2250/03* (2013.01); *F17C 2201/0109* (2013.01); *F17C 2201/0123* (2013.01); *F17C 2201/0142* (2013.01); *F17C 2201/035* (2013.01); *F17C 2201/054* (2013.01); *F17C 2201/06* (2013.01); *F17C 2203/0304* (2013.01); *F17C 2203/0604* (2013.01); *F17C 2203/0607* (2013.01); *F17C 2203/0609* (2013.01); *F17C 2203/0619* (2013.01); *F17C 2203/0621* (2013.01); *F17C 2203/0624* (2013.01); *F17C 2203/0639* (2013.01); *F17C 2203/0643* (2013.01); *F17C 2205/018* (2013.01); *F17C 2205/0142* (2013.01); *F17C 2205/0146* (2013.01); *F17C 2205/0341* (2013.01); *F17C 2205/0397* (2013.01); *F17C 2209/2109* (2013.01); *F17C 2209/221* (2013.01); *F17C 2209/232* (2013.01); *F17C 2221/031* (2013.01); *F17C 2223/0123* (2013.01); *F17C 2223/035* (2013.01); *F17C 2225/0123* (2013.01); *F17C 2225/035* (2013.01); *F17C 2227/0157* (2013.01); *F17C 2227/0185* (2013.01); *F17C 2227/0362* (2013.01); *F17C 2260/046* (2013.01); *F17C 2265/07* (2013.01); *F17C 2270/0134* (2013.01)

(56) References Cited

U.S. PATENT DOCUMENTS

| | | | | |
|---|---|---|---|---|
| 4,526,005 | A * | 7/1985 | Laing et al. | 60/659 |
| 4,619,374 | A | 10/1986 | Yavorsky | |
| 6,955,050 | B2 * | 10/2005 | Perkins et al. | 60/645 |
| 7,127,895 | B2 * | 10/2006 | Pinkerton et al. | 60/646 |
| 2005/0126172 | A1 * | 6/2005 | Hudson et al. | 60/659 |
| 2010/0218500 | A1 * | 9/2010 | Ruer | 60/659 |
| 2011/0005226 | A1 * | 1/2011 | Ashikian | 60/659 |

OTHER PUBLICATIONS

Unofficial English Translation of Chinese Office Action is issued in connection with corresponding CN Application No. 201210089760.5 on Feb. 2, 2015.

* cited by examiner

VESSEL OF A HEAT STORAGE AND RELEASE APPARATUS, HEAT STORAGE AND RELEASE ASSEMBLY, AND ENERGY PRODUCTION PLANT

BACKGROUND OF THE INVENTION

1. Field of the Invention

The embodiments of the subject matter disclosed herein generally relate to the storage of heat and release of pre-stored heat. More specifically, the embodiments relate to a vessel of a heat storage and release apparatus and energy production.

2. Description of the Prior Art

The demand for energy, particularly for electrical energy, varies considerably from time to time during a day, a week, a month or an year; however, energy production plants often produce energy on a relatively constant basis, thus, the production of energy is different from the demand. Examples of energy production plants whose production cannot be easily adapted to the demand are wind power plants and solar power plants.

There is known means to store energy during periods of low demand and to release it during periods of high demand.

A technology for doing so is based on compressed air and involves the storage of the compressed air in an excavated or natural cavern. Excess energy is used to operate a compressor which compresses air and sends it to the cavern during periods of low demand. During periods of high demand, the compressed air in the cavern is used to drive an expander for operating energy production equipment, for example, an electrical generation equipment.

During compression, air heats considerably (it may reach several hundred degrees Celsius); therefore, in the past, it has been conceived, according to an improved technology, to store the heat of the compressed air before storing the compressed air in the cavern at low temperature; when the compressed air in the cavern is required for producing energy, the stored heat is used to heat the compressed air coming from the cavern before providing it to the expander; for this purpose, heat storage and release apparatuses have been designed and used. In this way, the overall efficiency of the storage and release process is increased.

Known heat storage and release apparatuses take the form of hollow towers of reinforced concrete; they have a height of several meters (e.g. 50 m), a diameter of several meters (e.g. 20 m) and a wall thickness of few meters (e.g. 3 m).

Natural caverns, excavated caverns and such known heat storage and release apparatuses suffer from tightness problems. Additionally, their walls are subject to embrittlement due to the high pressure (e.g. 50 bar) and/or the high temperature (e.g. 500° C.) of the injected air and wet conditions that are often present worsen the situation. Finally, concrete walls are cumbersome and need to be cooled, for example, by forced water circulation next to or inside the walls when high-temperature air is injected into the apparatus.

Accordingly, it would be desirable to design and provide energy storage and release technology which overcomes the aforementioned drawbacks of the prior art.

BRIEF SUMMARY OF THE INVENTION

According to an embodiment of the present invention, there is provided a vessel of a heat storage and release apparatus, the vessel comprises a shell comprising a metallic material, the shell having an elongated shape with a first end region and a second end region remote from the first end region, and an internal surface defining a cavity configured to contain a heat storage and release device and to guide gas-flow; a first opening through the shell for a flow of gas at high temperature and high pressure, the first opening being located in the first end region; a second opening through the shell for a flow of gas at low temperature and high pressure, the second opening being located in the second end region; and a lining of thermally insulating material adjacent to the internal surface and only partially covering the internal surface, the lining being located at least in the first end region.

According to another embodiment of the present invention, there is provided a heat storage and release assembly, the assembly comprises at least one heat storage and release apparatus, wherein the at least one heat storage and release apparatus comprises a vessel and a heat storage and release device. The vessel comprises a shell comprising a metallic material, the shell having an elongated shape with a first end region and a second end region remote from the first end region, and an internal surface defining a cavity configured to contain a plurality of heat storage and release devices and to guide gas-flow; a first opening through the shell for a flow of gas at high temperature and high pressure, the first opening being located in the first end region; a second opening through the shell for a flow of gas at low temperature and high pressure, the second opening being located in the second end region; and a lining of thermally insulating material adjacent to the internal surface and only partially covering the internal surface, the lining being located at least in the first end region. The heat storage and release device is located inside the cavity.

According to another embodiment of the present invention, there is provided an energy production plant, the plant comprises a compressor coupled to an engine, the compressor comprising an inlet for a low-pressure low-temperature gas-flow and an outlet for a high-pressure high-temperature gas-flow; an expander coupled to an energy generator, the expander comprising an inlet for a high-pressure high-temperature gas-flow and an outlet for a low-pressure low-temperature gas-flow; a gas storage chamber comprising an opening and configured to store gas at high-pressure; and at least one heat storage and release apparatus comprising a vessel and a heat storage and release device. The vessel comprises a shell comprising a metallic material, the shell having an elongated shape with a first end region and a second end region remote from the first end region, and an internal surface defining a cavity configured to contain a plurality of heat storage and release devices and to guide gas-flow; a first opening through the shell for a flow of gas at high temperature and high pressure, the first opening being located in the first end region; a second opening through the shell for a flow of gas at low temperature and high pressure, the second opening being located in the second end region; and a lining of thermally insulating material adjacent to the internal surface and only partially covering the internal surface, the lining being located at least in the first end region. The heat storage and release device is located inside the cavity.

BRIEF DESCRIPTION OF THE DRAWINGS

The accompanying drawings illustrate exemplary embodiments of the present invention, wherein.

DETAILED DESCRIPTION OF THE INVENTION

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
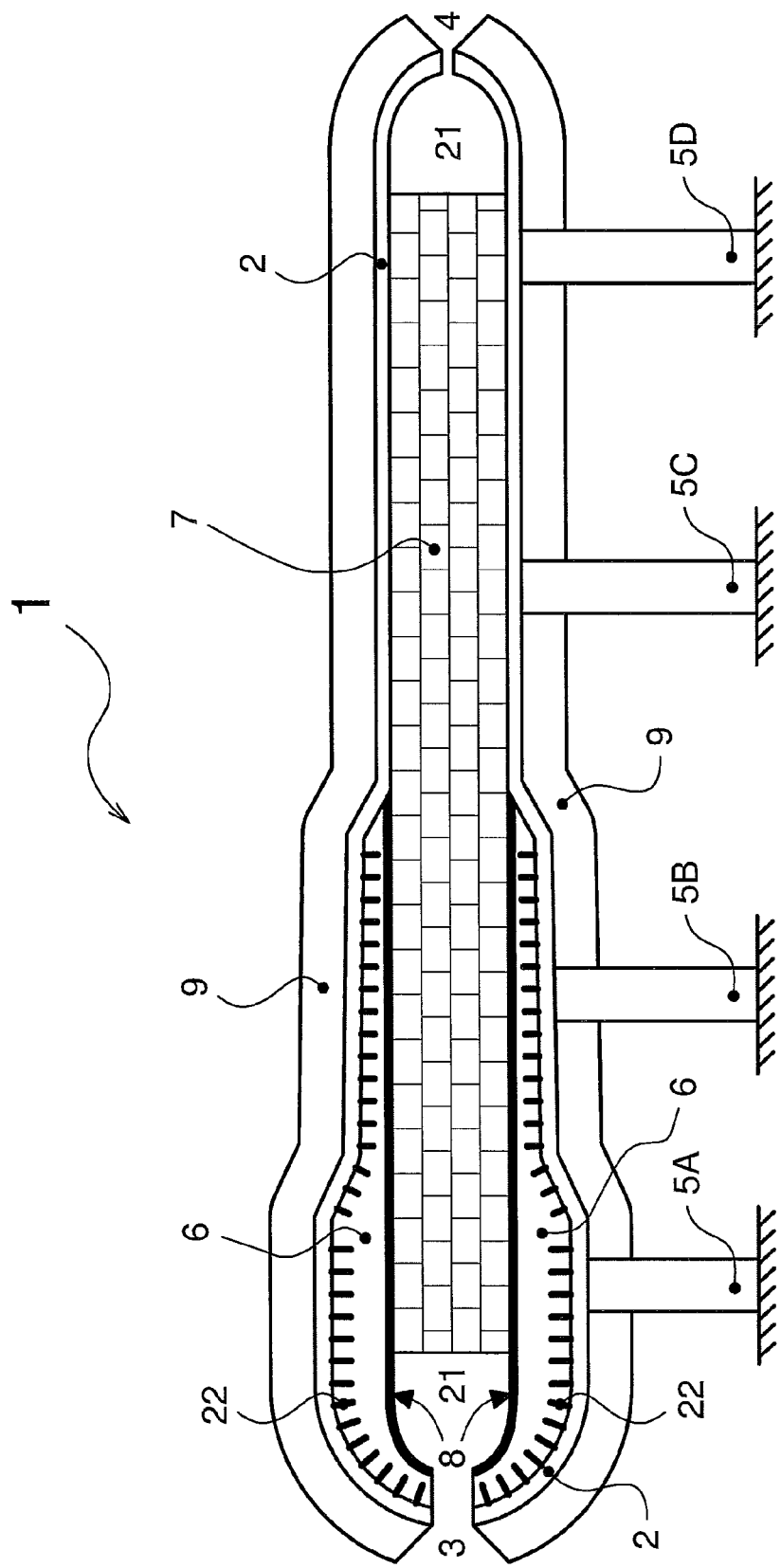
FIG. 1 shows a vessel of a heat storage and release apparatus according to an exemplary embodiment of the present invention.
Figure 2:
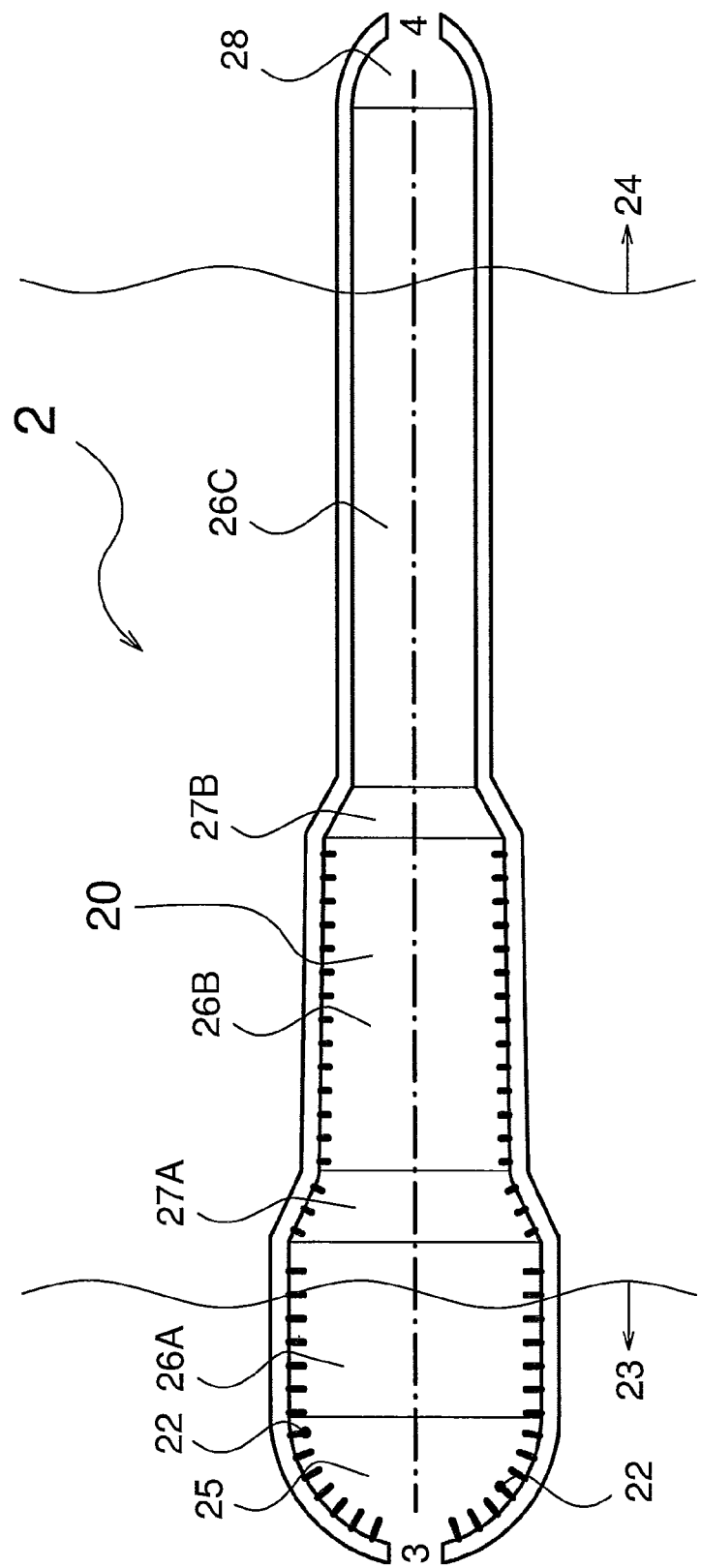
FIG. 2 shows the shell of the vessel of FIG. 1 according to an exemplary embodiment of the present invention.

The embodiment of FIG. 1 is a vessel 1 of a heat storage and release apparatus. FIG. 1 is a schematic cross-section view of the vessel 1 with all its components, while FIG. 2 is a schematic cross-section view of only the shell 2 of the vessel 1 of FIG. 1.

The vessel 1 comprises a shell 2 made of metallic material with an internal surface defining a cavity 20, as well as a first opening 3 through the shell 2 and a second opening 4 through the shell 2 so that the cavity 20 can be placed in fluid communication with other devices. The shell 2 has an elongated shape with a first end region 23 and a second end region 24 remote from the first end region 23; the first opening 3 is located in the first end region 23 and the second opening 4 is located in the second end region 24. The shell 2 is configured to contain a heat storage and release device 7 and to guide gas-flow; gas may flow from the first opening 3, inside the cavity 20 through the heat storage and release device 7, to the second opening 4. In this case, the opening 3 acts as an inlet and the opening 4 acts as an outlet. Alternatively, gas may flow from the second opening 4, inside the cavity 20 through the heat storage and release device 7, to the first opening 3. In this case the opening 3 acts as an outlet and the opening 4 acts as an inlet. The opening 3 is suitable for gas at high temperature, for example, hundreds of degrees Celsius, and at high pressure, for example, tens of bars, while the opening 4 is suitable for gas at low temperature, for example, tens of degrees Celsius, and at high pressure, for example, tens of bars; the flow across the vessel 1 and through the heat storage and release device 7 causes a pressure drop, for example, by a few bars.

Although any gas may in principle flow inside the vessel 1, it is to be expected that the vessel 1 will be used with normal air that is readily available (therefore cheap) and safe.

The heat storage and release device 7 may take the form of a plurality of bricks made of a material having a high specific heat capacity and placed one over the other. In order to allow the flow of gas through the device, the bricks may have through holes and/or may be spaced between each other.

The purpose of the heat storage and release device 7 is to store heat when the device cones in contact with a flow of hot gas and to release heat when the device comes in contact with a flow of cold gas; otherwise, the device (as well as its bricks if provided) tends to maintain its temperature and its heat because of the low thermally conductive materials of and in the vessel 1 (see, e.g., element 6 and 9).

The shell 2 of the vessel 1 of the embodiment of FIG. 1 (see also FIG. 2) has a substantially cylindrical shape; its length may be of several tens of meters (e.g. 30-90 m); its diameter may be of several meters (e.g. 5-10 m). The shell 2 is arranged in horizontal position so that it can be installed relatively easily without any thermodynamic or fluid dynamic disadvantage. Because of the shell's 2 horizontal position, the shell 2 can better withstand strong wind and earthquakes. The shell 2 is supported by support elements 5A, 5B, 5C, 5D). In one embodiment, the support elements are U-shaped. In one embodiment, the support elements comprise four support elements 5A, 5B, 5C, 5D.

According to the embodiment of FIG. 1 (see also FIG. 2), the shell 2 is made by a combination of pieces joined together, for example, by means of welding The shell 2 is provided with: two end sections plus a number of cylindrical sections and transition sections sequentially arranged; more specifically, there is a first end section 25, a first cylindrical section 26A, a first transition section 27A, a second cylindrical section 26B, a second transition section 27B, a third cylindrical section 26C, and a second end section 28. The end sections 25 and 28 are dome-shaped. The transition sections 27A and 27B have the shape of a truncated cone; each of these sections may result from one or more pieces joined together. The thickness of the shell 2 is substantially constant (in this specific embodiment there is a thickness variation of about 10%) and may be of some centimeters, for example, 7-15 cm. Such a modular structure of simple construction sections makes the shell 2 easy to be manufactured and constructed. As it appears from the figures, the longitudinal cross-section of the shell 2 is step-like (to be precise, the riser is inclined and not vertical) mainly for manufacture and construction reasons. Alternatively, it is possible to have a gradual shape (e.g. conical).

In one embodiment, a set of real sizes of the shell 2 used is provided: section 25 has an internal diameter of about 7.4 m, section 26A has a length of about 6.0 m, section 27A has a length of about 1.5 m and an initial internal diameter of about 7.4 m and a final internal diameter of about 7.2 m, section 26B has a length of about 9.0 m, section 27B has a length of about 1.5 m and an initial internal diameter of about 7.2 m and a final internal diameter of about 7.0 m, section 26C has a length of about 32.0 m, section 28 has an internal diameter of about 7.0 m; the thickness of section 25 is about 5.5 cm, the thickness of section 26A is about 10 cm, the thickness of section 27A is about 10 cm, the thickness of section 26B is about 9.8 cm, the thickness of section 27B is about 9.8 cm, the thickness of section 26C is about 9.4 cm at the beginning and about 9.1 cm at the end, the thickness of section 28 is about 5.0 cm; therefore, the thicknesses of the end sections are substantially equal and considerably smaller (about 50%) than the thicknesses of the other sections due to their approximately spherical shape.

In addition to the shell 2, the vessel 1 comprises a lining 6 of thermally insulating material. As can be clearly seen in FIG. 1, the lining 6 of this embodiment is adjacent to the internal surface of the shell 2 and covers it only partially. As the purpose of the lining 6 is to thermally insulate the shell 2 from the hot gas or, in other terms, to reduce the temperature at which the shell 2 is exposed, it is located at least in the first end region 23, i.e., where the first opening 3 is located. In the specific embodiment of FIG. 1, the lining 6 is located inside the first end section 25, the first cylindrical section 26A, the first transition section 27A, the second cylindrical section 26B, the second transition section 27B. The thermally insulating material of the lining 6 is a refractory material able to withstand well the high temperature of the gas, for example, a slurry comprising aluminosilcates.

During normal operation, the temperature of the gas inside the cavity 20 varies from a high temperature (e.g. 500-700° C.) in the first end region 23 to a low temperature (e.g. 50-80° C.) in the second end region. Because of the lining 6, the temperature of the metallic shell 2 may be limited below said high temperature (limited to, e.g., 300°-450° C.). Therefore, the design of the size and of the material of the shell 2 becomes less difficult; for example, simple carbon steel can be used instead of expensive alloys. Additionally, cooling, of the vessel 1 through, e.g., forced water circulation can be avoided and wet conditions can also be avoided together with the corresponding risk of corrosion.

The lining 6 may have a non-constant thickness, as it is the case of the embodiment of FIG. 1. In particular, the thickness of the lining 6 decreases along the shell 2 starting from the first opening 3 onwards, i.e., towards the second opening 4; it stops at a distance from the first opening 3, specifically at the end of section 27B. In the embodiment of FIG. 1, the thickness varies step by step mainly for manufacture and construction reasons. Alternatively, it is possible to have a gradual variation; it is to be considered that the thickness of the lining 6 may depend on the shape of the shell 2.

The thickness of the lining 6 may be so selected as to maintain the shell 2 at a substantially uniform temperature during operation. The temperature of the shell 2 may be set quite high (e.g. 400-500° C.). This is the case of the embodiment of FIG. 1 with regard to that part of the shell 2 where the lining 6 is located, i.e., sections 25, 26A, 27A, 26B, 27B; afterwards, the temperature of the shell 2 decreases similarly to that of the gas; the local thickness of the lining 6 is related to the local temperature of the gas.

In the embodiment of FIG. 1, the lining 6 is so sized and arranged on the shell 2 as to define a room 21 whose transversal cross-section is substantially constant (specifically, circular). According to the embodiment mentioned above, it has a constant diameter of about 7 m; in this way, the gas-flow is regular and uniform. According to the embodiment mentioned above, the thickness of the lining 6 on sections 25 and 26A is about 25 cm and the thickness of the lining 6 on section 26B is about 17 cm.

The lining 6 is subject to the action of high-pressure and high-temperature flow of gas. In order to protect the lining 6, especially when it is made of brittle material, the lining 6 may be covered by a thin (for example 4-6 mm) layer of protective material 8. The protective material 8 may be stainless steel.

The layer of protective material 8 may be realized by means of a metal ribbon (for example 4-6 mm thick and 10-20 cm wide) unrolled and laid down on the lining 6. Afterwards, the unrolled ribbon is fixed to the shell 2, for example, by welding it to elements (not shown) extending from the internal surface of the shell 2.

There are many ways of applying thermally insulating material to the internal surface of the shell 2. The most effective way is by casting it. In order to get a lining 6 firmly anchored to the shell 2, the shell 2 may be provided with projections 22 extending from the internal surface towards the cavity 20. These projections 22 may take the form of studs or clips welded to the internal surface of the shell 2.

As already discussed, the operating temperature of the shell 2 of the vessel 1 may be quite high (e.g. 400-500° C.). Therefore, the shell 2 should be externally surrounded by a layer of thermally insulating material 9 in order to reduce or avoid) heat losses from the shell 2, and therefore heat losses from the heat storage and release device 7 inside the shell 2, at least when there is no flow of gas through the shell 2. This layer of thermally insulating material 9 may be provided also as a safety measure, for example, for the maintenance personnel. When the shell 2 is provided with the external layer of thermally insulating material 9, the vessel 1 can be considered "adiabatic".

The combination of a vessel 1, as defined herein and as shown as a possible embodiment in FIG. 1, and a heat storage and release device 7 located inside its cavity 20 provides a heat storage and release apparatus.

The purpose of the heat storage and release device 7 is to store heat when the device 7 comes in contact with a flow of hot gas, and to release heat when the device 7 comes in contact with a flow of cold gas. Otherwise, the device 7 tends to maintain its temperature and its heat because of the low thermally conductive materials of and in the vessel 1.

Depending on the specific application, the various parts of the vessel 1 may vary in terms of, e.g., dimensions, materials, arrangements. The operating parameters, for example the temperatures and the pressures, may also vary.

Figure 3:
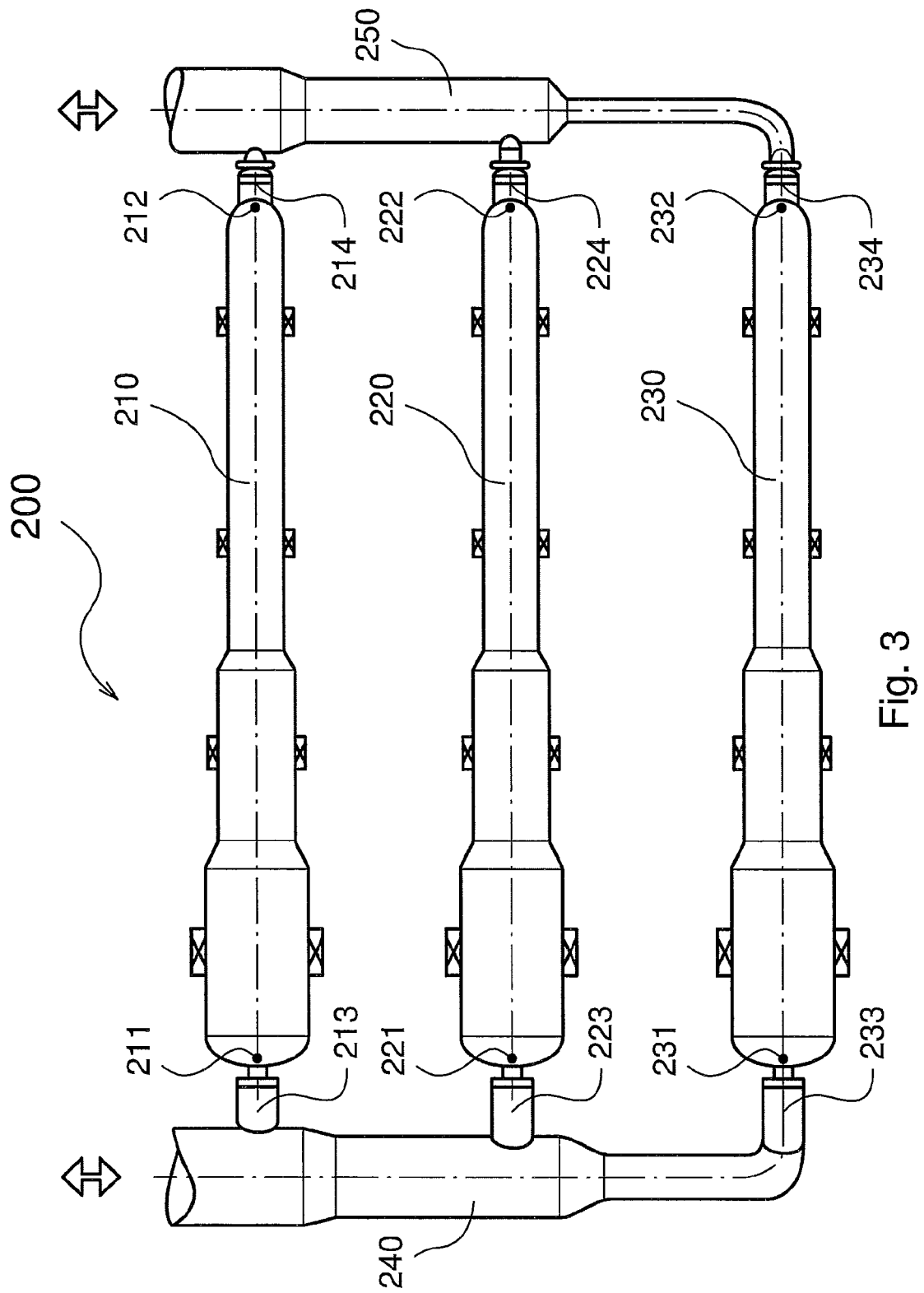
FIG. 3 shows a heat storage and release assembly according to an exemplary embodiment of the present invention.

FIG. 3 is a schematic top view of an embodiment of a heat storage and release assembly 200. The illustrated embodiment comprises three heat storage and release apparatuses 210, 220, 230. Alternatively, a different number may be provided with a minimum of one. In this specific embodiment, the apparatuses 210, 220, 230 are all identical to that of FIG. 1. Alternatively, different apparatuses may be combined. Each of the apparatuses 210, 220, 230 have a first opening 211, 221, 231 (corresponding to the respective first openings of the vessels) and a second opening 212, 222, 232 (corresponding to the respective second openings of the vessels); the first openings 211, 221, 231 are connected to a pipe 240, and the second openings 212, 222, 232 are connected to a pipe 250. Pipe 240, pipe 250 and possibly other pipes constitute the piping of the assembly 200. Between an opening and a pipe, a bellows device is provided for compensating for the expansion/retraction of the long metallic shell in the apparatus due to the flow of very hot gas. In the embodiment of FIG. 3, six bellows devices 213, 214, 223, 224, 233, 234 are provided. Pipe 240 is configured for bidirectional flow of gas at high pressure and high temperature while pipe 250 is configured for bidirectional flow of gas at high pressure and low temperature. Although not shown in the figure, pipe 240 has an internal thermally insulating lining and is possibly surrounded by a layer of thermally insulating material. The linings allow the pipe 240 to operate at the desired temperature. The layer may be provided as a safety measure for the maintenance personnel and/or as a way to reduce heat losses. The insulating lining and the insulating layer of the pipe 240 may be made in the same way and/or with the same materials as the insulating lining 6 and the insulating layer 9 of the shell 2. The apparatuses 210, 220, 230 are arranged one beside the other at a certain distance. Such distance is selected for allowing easy installation and/or maintenance of the assembly. The distance may be, for example, a few meters (e.g. 2-3 m). It is to be expected that, typically, each the apparatuses 210, 220, 230 of FIG. 3 will be embodied with a length of several tens of meters (e.g. 30-90 m) and a diameter of several meters (e.g. 5-10 m).

A good operation of the assembly 200 and its apparatuses 210, 220, 230 depend, among other things, on the design of the piping of the assembly 200. According to the embodiment of FIG. 3, the pipes 240, 250) fluidly connect in parallel all heat storage and release apparatuses 210, 220, 230 (that are identical) and its cross-section is such as to maintain a substantially uniform flow speed in the piping of the assembly 200. In this way, the same temperature drop of e.g., 400-700° C. is established across the apparatuses 210, 220, 230. In the embodiment of FIG. 3, the pipes 240, 250 are similar, i.e., each comprises a first straight pipe section, a first transition section reducing the cross-section of the piping by 33%, a second straight pipe section, a first transition section reducing the cross-section of the piping by further 33%, a third straight pipe section having a 90° bend at the end; at the end of the first straight pipe section an opening is provided for fluidly connecting the first apparatus 210 possibly through a bellows device 213, 214; at the end of the second straight pipe section an opening is provided for fluidly connecting the second apparatus 220 possibly through a bellows device 223, 224; at the end of the third pipe section an opening is provided for fluidly connecting the third apparatus 230 possibly through a bellows device 233, 234.

The heat storage and release assembly 200 may have three basic operating phases: a heat storage operating phase, a heat release operating phase, and a heat maintaining operating phase. With reference to the embodiment of FIG. 3, during the heat storage operating phase, gas at high pressure and high temperature flows into the pipe 240, enters the cavities of the three apparatuses 210, 220, 230 through their first openings 211, 221, 231, flows through the heat storage and release devices in the cavities providing heat to them (the devices increase their temperature and the gas decreases its temperature), exits the cavities through their second openings 212, 222, 232, and flows out of the pipe 250 at high pressure but at low temperature. During the heat release operating phase, gas at high pressure and low temperature flows into the pipe 250, enters the cavities of the three apparatuses 210, 220, 230 through their second openings 212, 222, 232, flows through the heat storage and release devices in the cavities receiving heat from them (the devices decrease their temperature and the gas increases its temperature), exits the cavities through their first openings 211, 221, 231, and flows out of the pipe 240 at high pressure and at high temperature. During the heat maintaining operating phase, no gas flows in the assembly and the heat storage and release devices maintain substantially their heat and their temperature (some heat loss cannot be avoided even if a layer of thermally insulating material is provided around the shells).

In order to achieve a very high efficiency, at least the shells of the apparatuses 210, 220, 230 and preferably also the pipe 240 should be externally completely surrounded by a layer of thermally insulating material.

Figure 4:
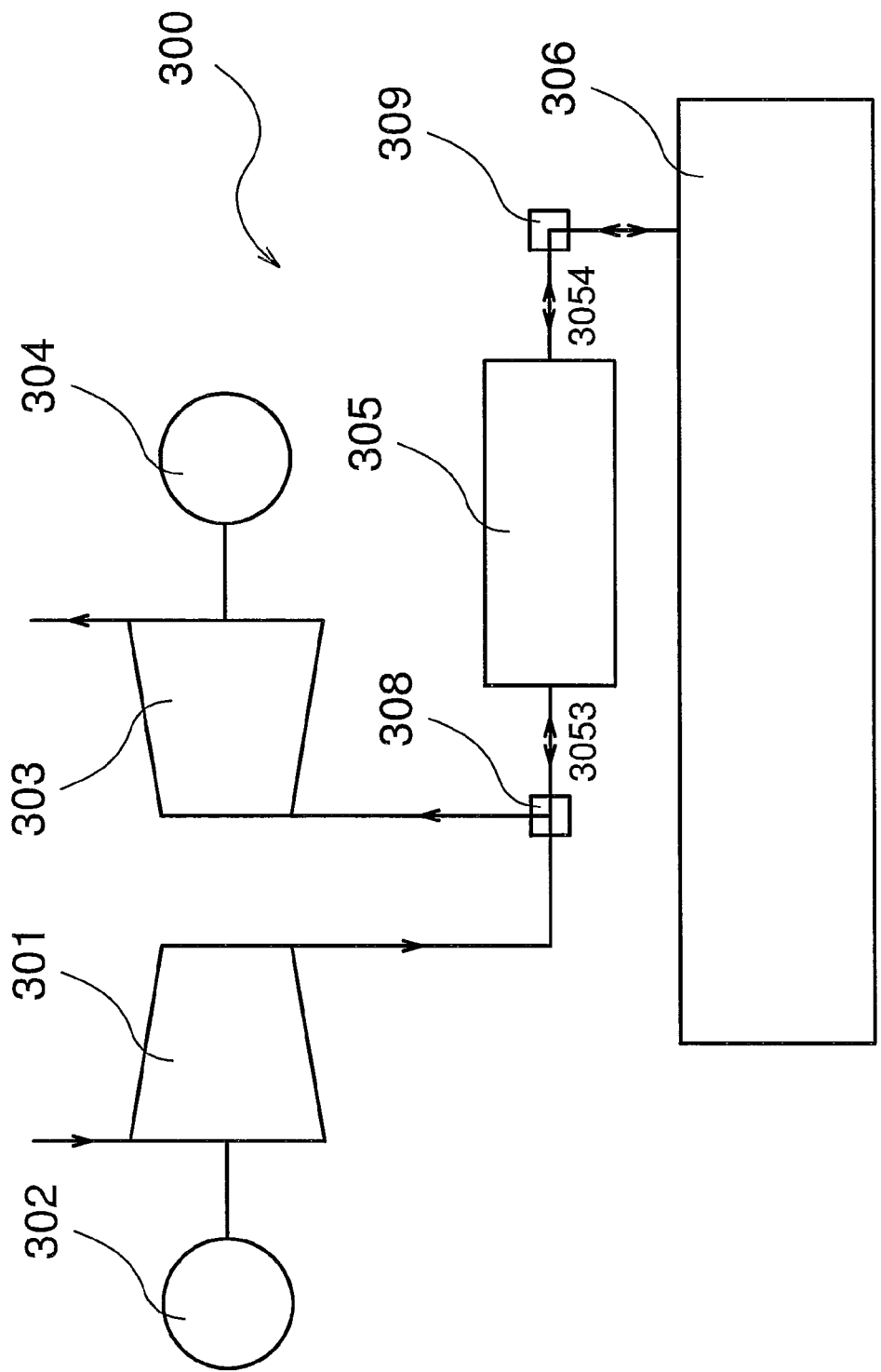
FIG. 4 shows an energy storage and release system of an energy production plant according to an exemplary embodiment of the present invention.

FIG. 4 shows a schematic diagram of only an energy storage and release system 300 of an embodiment of an energy production plant.

System 300 comprises a compressor 301 coupled to an engine 302, i.e., a driving machine, and having an inlet for a low-pressure, low-temperature gas-flow and an outlet for a high-pressure, high-temperature gas-flow. The system 300 also comprises an expander 303 coupled to an energy generator 304, i.e., a driven machine, and having an inlet for a high-pressure, high-temperature gas-flow and an outlet for a low-pressure, low-temperature gas-flow. The system 300 further comprises a gas storage chamber 306, commonly called "cavern", for storing gas at high-pressure having an opening, and at least one heat storage and release apparatus.

Engine 302 receives energy, for example, excess energy, from the main energy generation system of the plant (not shown in FIG. 4) during periods of low demand.

A heat storage and release assembly 305 comprises one or more heat storage and release apparatuses as defined herein. It should be understood that heat storage and release assembly 305 is similar to the heat storage and release assembly 200 shown in FIG. 3. Assembly 305 is provided with a first pipe 3053 connected to the first openings of the apparatuses of the vessels and a second pipe 3054 connected to the second openings of the apparatuses of the vessels. Assuming that element 305 corresponds to the assembly of FIG. 3, the pipe 3053 in FIG. 4 corresponds to the pipe 240 in FIG. 3 and the pipe 3054 in FIG. 4 corresponds to pipe 250 in FIG. 3.

In FIG. 4, there are also shown valves for controlled fluid connection within the system 300. Specifically, valve 308 is a three-port valve connected to compressor 301, expander 303 and assembly 305, and valve 309 is a two-port valve connected to assembly 305 and chamber 306.

It is to be noted that an embodiment of such a system 300 will most likely contain other components such as gears, filters, coolers, heaters, valves, etc. Additionally, the structure of the compressor 301 and the expander 303 may be more or less complicated (e.g. single or multiple stages).

During a period of low energy demand, the pipe 3053 (i.e. the first openings of the apparatuses) is fluidly connected through valve 308 to the outlet of the compressor 301 and the pipe 3054 (i.e. the second openings of the apparatuses) is fluidly connected through valve 309 to the opening of the gas storage chamber 306, so that the gas compressed by compressor 301 is stored in chamber 306 after heat is removed by assembly 305.

During a period of high energy demand, the pipe 3053 (i.e. the first openings of the apparatuses) is fluidly connected through valve 308 to the inlet of the expander 303 and the pipe 3054 (i.e. the second openings of the apparatuses) is fluidly connected through valve 309 to the opening of the gas storage chamber 306, so that gas stored in chamber 306 is heated by assembly 305 prior to being delivered to expander 303.

During a period of normal energy demand, the pipes 3053 and 3054 (i.e. the first and second openings of the apparatuses) are fluidly disconnected by means of valves 308 and 309.

In order to achieve a very high efficiency, at least the shell or shells of the heat storage and release assembly 305, and also its pipe or pipes, may be externally completely surrounded by a layer of thermally insulating material.

The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims.

This written description uses examples to disclose the present invention, including the best mode, and also to enable any person skilled in the art to practice the present invention, including making and using any devices or systems and performing any incorporated methods.

The patentable scope of the present invention is defined by the following claims, and may include other examples that occur to those skilled in the art. Such other examples are intended to be within the scope of the claims if they have structural elements that do not differ from the literal language of the claims, or if they include equivalent structural elements within the literal languages of the claims.

What is claimed is:

1. A vessel of a heat storage and release apparatus, the vessel comprising:
   a shell comprising a metallic material, the shell having an elongated shape with a first end region and a second end region remote from the first end region, and an internal surface defining a cavity configured to contain a heat storage device and to guide gas-flow;

a first opening through the shell for a flow of gas at high temperature and high pressure, the first opening being located in the first end region;

a second opening through the shell for a flow of gas at low temperature and high pressure, the second opening being located in the second end region;

an external thermally insulating material provided on the shell; and a thermally insulating lining adjacent to the internal surface of the shell and the external thermally insulating material, and only partially covering the internal surface, the lining being located at least in the first end region.

2. The vessel according to claim 1, wherein the shell comprises projections extending from the internal surface towards the cavity so that the thermally insulating material firmly anchors to the shell.

3. The vessel according to claim 1, wherein the lining has a thickness that is not constant.

4. The vessel according to claim 3, wherein the lining has a thickness that decreases along the shell starting from the first opening.

5. The vessel according to claim 1, wherein the thickness of the lining is such as to maintain the shell at a substantially uniform temperature where the lining is located during operation of the vessel.

6. The vessel according to claim 1, wherein the external thermally insulating material surrounds the shell.

7. The vessel according to claim 1, wherein the lining is covered by a thin layer of protective material.

8. The vessel according to claim 1, wherein the shell extends longitudinally and comprises an inclined longitudinal cross-section.

9. The vessel according to claim 1, wherein the shell is arranged in a substantially horizontal position.

10. A heat storage and release assembly comprising at least one heat storage and release apparatus, the at least one heat storage and release apparatus comprising:

a vessel comprising:
   a shell comprising a metallic material, the shell having an elongated shape with a first end region and a second end region remote from the first end region, and an internal surface defining a cavity configured to contain a plurality of heat storage devices and to guide gas-flow;
   a first opening through the shell for a flow of gas at high temperature and high pressure, the first opening being located in the first end region;
   a second opening through the shell for a flow of gas at low temperature and high pressure, the second opening being located in the second end region;
   an external thermally insulating material provided on the shell; and
   a thermally insulating lining adjacent to the internal surface of the shell and the external thermally insulating material, and only partially covering the internal surface, the lining being located at least in the first end region.

11. An energy production plant comprising:
   a compressor coupled to an engine, the compressor comprising an inlet for a low-pressure low-temperature gas-flow and an outlet for a high-pressure high-temperature gas-flow;
   an expander coupled to an energy generator, the expander comprising an inlet for a high-pressure high-temperature gas-flow and an outlet for a low-pressure low-temperature gas-flow;
   a gas storage chamber comprising an opening and configured to store gas at high-pressure; and
   at least one heat storage and release apparatus comprising a vessel comprising:
      a shell comprising a metallic material, the shell having an elongated shape with a first end region and a second end region remote from the first end region, and an internal surface defining a cavity configured to contain a plurality of heat storage devices and to guide gas-flow;
      a first opening through the shell for a flow of gas at high temperature and high pressure, the first opening being located in the first end region and being selectively fluidly connected to the outlet of the compressor and to the inlet of the expander;
      a second opening through the shell for a flow of gas at low temperature and high pressure, the second opening being located in the second end region and being controllably fluidly connected to the opening of the gas storage chamber;
   an external thermally insulating material provided on the shell; and
   a thermally insulating lining adjacent to the internal surface of the shell and the external thermally insulating material, and only partially covering the internal surface, the lining being located at least in the first end region.

12. The energy production plan according to claim 11, wherein the shell comprises projections extending from the internal surface towards the cavity so that the thermally insulating material firmly anchors to the shell.

13. The energy production plan according to claim 11, wherein the lining has a thickness that is not constant.

14. The energy production plan according to claim 13, wherein the lining has a thickness that decreases along the shell starting from the first opening.

15. The energy production plan according to claim 11, wherein the thickness of the lining is such as to maintain the shell at a substantially uniform temperature where the lining is located during operation of the vessel.

16. The energy production plan according to claim 11, wherein the external thermally insulating material surrounded surrounds the shell.

17. The energy production plan according to claim 11, wherein the lining is covered by a thin layer of protective material.

18. The energy production plan according to claim 11, wherein the shell extends longitudinally and comprises an inclined longitudinal cross-section.

19. The energy production plan according to claim 11, wherein the shell is arranged in a substantially horizontal position.

* * * * *